United States Patent
Iwahashi et al.

(10) Patent No.: US 12,206,589 B2
(45) Date of Patent: Jan. 21, 2025

(54) COMMUNICATION CONTROL DEVICE AND COMMUNICATION CONTROL METHOD

(71) Applicant: NIPPON TELEGRAPH AND TELEPHONE CORPORATION, Tokyo (JP)

(72) Inventors: Hiroki Iwahashi, Tokyo (JP); Kaori Kurita, Tokyo (JP); Koji Sugisono, Tokyo (JP); Hidetaka Nishihara, Tokyo (JP); Kazuhiro Matsuo, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 826 days.

(21) Appl. No.: 17/268,418

(22) PCT Filed: Aug. 14, 2019

(86) PCT No.: PCT/JP2019/031956
§ 371 (c)(1),
(2) Date: Feb. 12, 2021

(87) PCT Pub. No.: WO2020/036200
PCT Pub. Date: Feb. 20, 2020

(65) Prior Publication Data
US 2022/0200918 A1    Jun. 23, 2022

(30) Foreign Application Priority Data
Aug. 16, 2018 (JP) .................... 2018-153308

(51) Int. Cl.
*H04L 47/25* (2022.01)
*H04L 47/20* (2022.01)
*H04L 47/41* (2022.01)

(52) U.S. Cl.
CPC .............. *H04L 47/25* (2013.01); *H04L 47/20* (2013.01); *H04L 47/41* (2013.01)

(58) Field of Classification Search
CPC ........................................................ H04L 47/00
See application file for complete search history.

(56) References Cited

U.S. PATENT DOCUMENTS

2003/0076781 A1* 4/2003 Enomoto ................ H04L 47/11
370/229
2007/0286070 A1* 12/2007 Schliwa-Bertling .... H04L 47/10
370/229

(Continued)

FOREIGN PATENT DOCUMENTS

JP           201642679 A    3/2016

*Primary Examiner* — Derrick W Ferris
*Assistant Examiner* — Sumitra Ganguly

(57) ABSTRACT

A communication control apparatus configured to control bands for flows monitors the amount of communication of each of the flows input to the communication line in a predetermined monitoring period. When a sum of the amounts of communication of the flows acquired by the monitoring exceeds a predetermined threshold, the communication control apparatus restricts the communication bands for the top N flows in the descending order of the amount of communication input to the communication line, according to the amounts of communication of the flows. In contrast, the communication control apparatus does not restrict the communication bands for flows lower than the top N flows.

17 Claims, 9 Drawing Sheets

(56) References Cited

U.S. PATENT DOCUMENTS

| | | | | |
|---|---|---|---|---|
| 2013/0003549 A1* | 1/2013 | Matthews | ........... | H04L 41/0668 |
| | | | | 370/235 |
| 2014/0153388 A1* | 6/2014 | Webb | ...................... | H04L 47/20 |
| | | | | 370/230 |
| 2014/0341109 A1* | 11/2014 | Cartmell | ................. | H04L 43/50 |
| | | | | 370/328 |
| 2014/0341568 A1* | 11/2014 | Zhang | ................ | H04Q 11/0005 |
| | | | | 398/34 |
| 2015/0333994 A1* | 11/2015 | Gell | ..................... | H04L 47/822 |
| | | | | 709/224 |
| 2016/0205041 A1* | 7/2016 | Lee | ........................ | H04L 47/41 |
| | | | | 709/226 |
| 2019/0222531 A1* | 7/2019 | Lin | .................... | H04L 41/5022 |

\* cited by examiner (a)

| FLOW REGISTRATION NUMBER | IP ADDRESS | NUMBER OF PACKETS | PACKET LENGTH | AMOUNT OF DATA | INFLOW BAND (Ui) |
|---|---|---|---|---|---|
| 1 | | | | | |
| 2 | | | | | |
| ... | | | | | |
| N | | | | | |
| ... | | | | | |
| ... | | | | | |

(b)

| TOTAL INFLOW BAND OF ALL FLOWS (Ua) |
|---|
| TOTAL INFLOW BAND OF TOP N FLOWS (Ui) |
| BAND OF OUTGOING LINE (B) |
| EXCESSIVE BAND (Ue = Ua − B) |

Fig. 3

COMMUNICATION CONTROL DEVICE AND COMMUNICATION CONTROL METHOD

CROSS-REFERENCE TO RELATED APPLICATIONS

This application is a U.S. 371 Application of International Patent Application No. PCT/JP2019/031956, filed on 14 Aug. 2019, which application claims priority to and the benefit of JP Application No. 2018-153308, filed on 16 Aug. 2018, the disclosures of which are hereby incorporated herein by reference in their entireties.

TECHNICAL FIELD

The present disclosure relates to a communication control apparatus and a communication control method.

BACKGROUND ART

In a best-effort communication line, when the total amount of communication of incoming lines exceeds the capacity of an outgoing line, packets are transferred in the order of arrival, and thus are transferred from the outgoing line in a band proportional to the amount of communication of each incoming line.

For example, consider the case where the capacity of an outgoing line in a best-effort communication line is 20 Mpps, and a flow of a user A, a flow of a user B, and a flow of a user C are input from incoming lines at 20 Mpps, 12 Mpps, and 2 Mpps, respectively. In this case, the total amount of communication of the incoming lines in the communication line is 34 Mpps, which exceeds the capacity (20 Mpps) of the outgoing line. Thus, the flow of each user is transferred from the outgoing line in a band proportional to the amount of communication of the corresponding incoming line. That is, the flow of the user A, the flow of the user B, and the flow of the user C are transferred at 11.8 Mpps, 7.0 Mpps, and 1.2 Mpps, respectively. As a result, the flow of the user C, which has a small amount of communication (2.0 Mpps), is affected by the flows of the users A and B having a large amount of communication and thus, its communication band is reduced.

According to one technique, to assign the communication band of an outgoing line in a best-effort communication line to users as fairly as possible, the communication band of a flow of a user having a large amount of communication is restricted based on statistical values of the amount of communication of a flow of each user. According to another technique, a portion of the communication band of an outgoing line in a communication line is evenly assigned to flows of users, and a remaining portion of the communication band is operated in a best-effort manner (see Patent Literature 1).

CITATION LIST

Patent Literature

Patent Literature 1: JP 2016-042679 A

SUMMARY OF THE INVENTION

Technical Problem

However, in the case where the communication band of a flow of a user having a large amount of communication is restricted, when another flow having a large amount of communication remains, the communication band of a flow of a user having a small amount of communication is also restricted. Additionally, when a portion of the communication band of an outgoing line in a communication line is evenly assigned to flows of users, the remaining portion of the communication band can not be used, which can reduce the usage efficiency of the communication line. Thus, an object of the present disclosure is to solve the aforementioned problems, and, in fairly assigning the communication band of a best-effort communication line to flows of users, to avoid restriction of the communication band for a flow of a user having a small amount of communication as much as possible, and prevent a decrease in the usage efficiency of the communication line.

Means for Solving the Problem

In order to solve the problems described above, the present disclosure provides a communication control apparatus configured to control bands for flows, the communication control apparatus including: a monitoring unit configured to monitor an amount of communication of each of the flows input to a communication line in a predetermined period; a flow identification unit configured to, when a sum of the monitored amounts of communication of the flows exceeds a predetermined threshold that is smaller than or equal to a capacity of the communication line, identify a predetermined number of top flows in a descending order of the amount of communication input to the communication line, as flows that are targets of communication band restriction; and a band control unit configured to restrict the communication band for each of the flows that are the targets of the communication band restriction such that the sum of the amounts of communication of the flows input to the communication line is smaller than or equal to the predetermined threshold.

Effects of the Invention

According to the present disclosure, in fairly assigning the communication band of a best-effort communication line to flows of users, it is possible to avoid restriction of the communication band for a flow of a user having a small amount of communication as much as possible, and prevent a decrease in the usage efficiency of the communication line.

BRIEF DESCRIPTION OF DRAWINGS

FIG. 3 is a view illustrating an example of statistical information in FIG. 2.

DESCRIPTION OF EMBODIMENTS

Hereinafter, embodiments of the present disclosure will be described with reference to drawings. Note that the present disclosure is not limited to the embodiments described below.

Overview

An overview of a communication control apparatus according to the present embodiment will be described with reference to FIG. 1. Note that the communication control apparatus described below controls the communication band of a best-effort communication line, for example, the bands for flows through the communication line. This communication control apparatus is implemented by, for example, a switch, a router, or the like.

The communication control apparatus monitors the amount of communication of each user's flow input to the best-effort communication line, for example, in a predetermined monitoring period (T). In the case where the total amount of communication of the users' flows in the monitoring period (T) exceeds the capacity of an outgoing line of the communication line, the communication control apparatus restricts the communication bands for the flows of the top users in the descending order of the amount of communication. For example, the communication control apparatus restricts the communication bands for the flows of the top users in the descending order of the amount of communication according to how large the amounts of communication of the flows of the users are.

Figure 1:
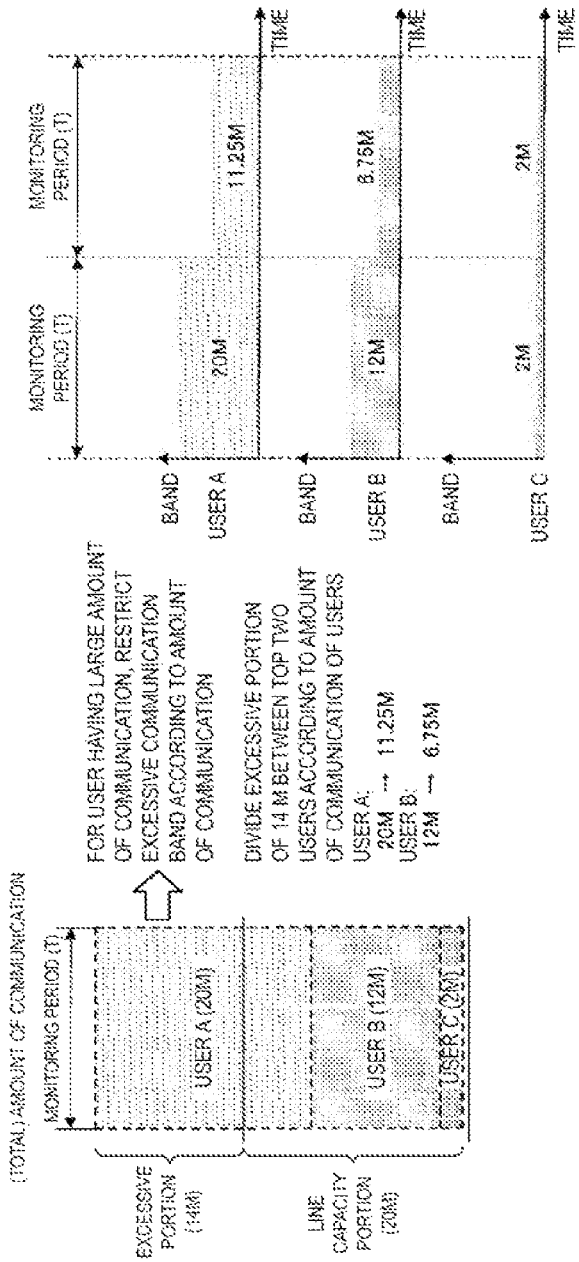
FIG. 1 is a view for describing an overview of a communication control apparatus.

For example, as illustrated in FIG. 1, consider the case where the capacity of a communication line is 20 M (bps), and the amount of communication (communication band) of each user's flow in the first monitoring period is 20 M (bps) for a flow of a user A, 12 M (bps) for a flow of a user B, and 2 M (bps) for a flow of a user C. In this case, because the total amount of communication of the flows of the users (34 M (bps)) exceeds the line capacity (20 M (bps)), the communication control apparatus restricts the communication bands for the top two flows in the descending order of the amount of communication (flows of the users A and B). For example, the communication control apparatus restricts the communication bands for the flows of the users A and B by proportionally dividing an excessive portion of the band of 14 M (bps) according to the amounts of communication of the flows of the users A and B.

Specifically, the communication control apparatus restricts the communication band for the flow of the user A to 11.25 M (bps) (=20 M (bps)−8.75 M (bps)), and restricts the communication band for the flow of the user B to 6.75 M (bps) (=12 M (bps)−1.25 M (bps)). On the other hand, the communication control apparatus does not restrict the communication band for the flow of the user C (2 M (bps)).

In this manner, in performing control such that the communication band of a best-effort communication line is fairly assigned to flows of users, the communication control apparatus can avoid restriction of the communication band for a flow of a user having a small amount of communication as much as possible, and prevent a decrease in the usage efficiency of the communication line.

Configuration

Figure 2:
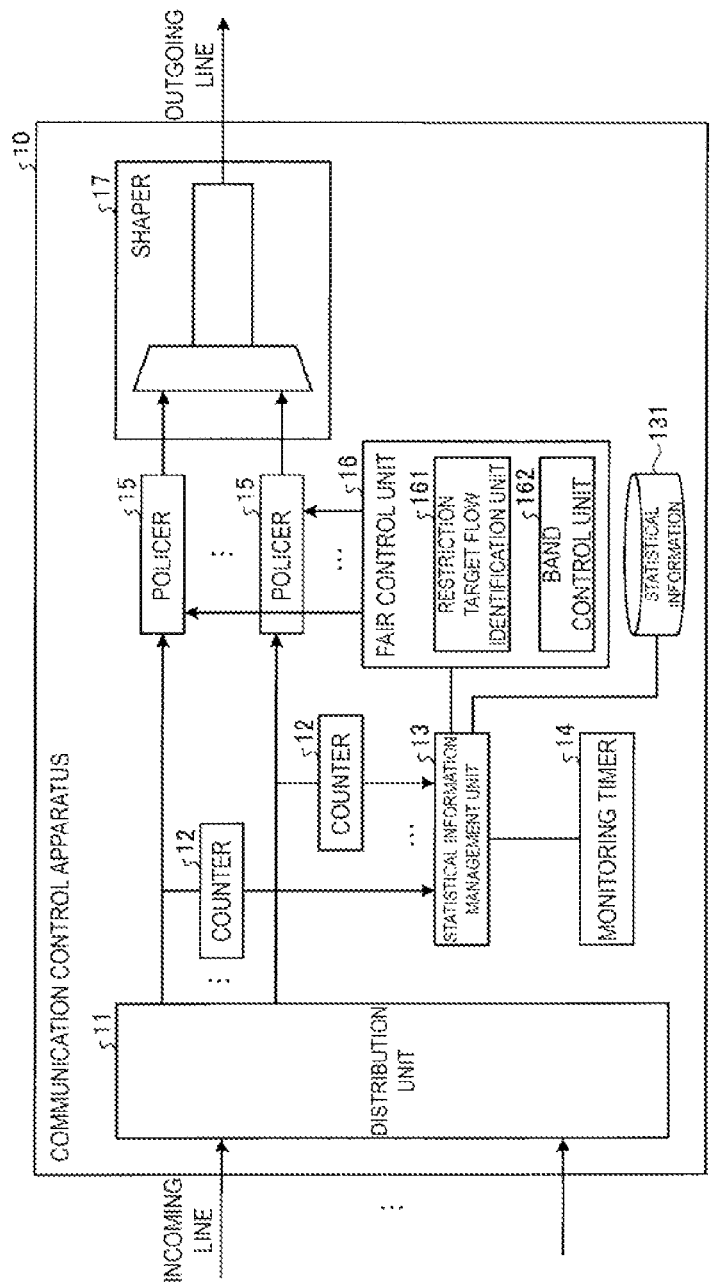
FIG. 2 is a view illustrating a configuration example of the communication control apparatus.

Next, the configuration of the communication control apparatus 10 will be described with reference to FIG. 2. The communication control apparatus 10 includes a distribution unit 11, counters 12, a statistical information management unit (monitoring unit) 13, a monitoring timer 14, policers 15, a fair control unit 16, and a shaper 17.

The distribution unit 11 distributes packets from a plurality of incoming lines to an identical outgoing line to each flow according to IP address or the like. The distributed packets are input to the policers 15.

Each counter 12 measures the amount of communication of each flow (for example, the number of packets and the amount of data).

The statistical information management unit 13 monitors the amount of communication of each flow in a predetermined monitoring period. Specifically, the statistical information management unit 13 monitors the amount of communication of each flow by the counter 12 until the monitoring period expiration is notified from the monitoring timer 14, and records a monitoring result in statistical information 131. Then, the statistical information management unit 13 sorts the information indicating the amount of communication of each flow in the statistical information 131 (see FIG. 3(*a*)) in the descending order of the inflow band, and passes the sorted information to the fair control unit 16.

The monitoring timer 14 holds a time for the monitoring period, and notifies the expiration of the monitoring period to the statistical information management unit 13 each time the monitoring period expires.

The statistical information 131 is information indicating the amount of communication of each flow in the monitoring period described above. For example, as illustrated in FIG. 3(*a*), the statistical information 131 is information registered for each flow registration number (i) and including the IP address, the number of packets, the packet length, the amount of data, the inflow band (Ui), and the like of the flow in the monitoring period described above. Note that, as illustrated in FIG. 3(*b*), the statistical information 131 may include, the total inflow bands for all flows (the total band of the flows, Ua), the total inflow bands for the top N flows (Uu), the band of the outgoing line in the communication line (B), and the excessive band (Ue=Ua−B).

A description will be made with reference to FIG. 2 again. The policers 15 perform policing of packets of flows under control of the fair control unit 16.

When the total amount of communication of the flows in the above monitoring period exceeds a predetermined threshold (for example, the capacity of the outgoing line), the fair control unit 16 restricts the communication band for a predetermined number of flows in descending order of the amount of communication. Note that the fair control unit 16 converts the amount of communication collected by the statistical information management unit 13 (for example, the number of packets, the data length, and the amount of data) into a communication band using the above-described monitoring period, and performs various calculations, but the present disclosure is not limited to this.

The fair control unit 16 includes a restriction target flow identification unit 161 and a band control unit 162.

When the total amount of communication of the flows in the monitoring period described above exceeds a predetermined threshold (for example, the capacity of the communication line), the restriction target flow identification unit 161 identifies a predetermined number of top flows in the descending order of the amount of communication as flows that are targets of communication band restriction.

For example, the restriction target flow identification unit 161 identifies the top N flows in the descending order of the amount of communication as flows of heavy users. Note that the value of N may be a fixed value or a top x % of input flows in consideration of the fluctuation in the number of flows input to the communication line. In other words, the above-mentioned value of N may be a value acquired by multiplying the number of flows input to the communication line by a predetermined ratio (x %).

In addition, from flows having an amount of communication exceeding a predetermined threshold (minimum guaranteed amount of communication) among the flows input to the communication line, the restriction target flow identification unit 161 may identify a predetermined number of flows (for example, top N flows) in the descending order of the amount of communication as flows that are targets of communication band restriction. That is, the restriction target flow identification unit 161 sets the minimum guaranteed amount of communication, and identifies the top N flows in the descending order of the amount of communication, among the flows exceeding the minimum guaranteed amount of communication, as the flows that are targets of communication band restriction.

In this manner, for example, in the case of restricting the top two flows in the descending order of the amount of communication, when the top flow has a large amount of communication, and the second top flow has a normal amount of communication or less, the restriction target flow identification unit 161 does not restrict the communication band of the second top flow.

Note that when the total amount of communication of flows in the monitoring period exceeds the predetermined threshold, the restriction target flow identification unit 161 may restrict the communication bands for a predetermined number of flows in the descending order of the amount of communication, or when the total communication band (inflow band) of flows exceeds the predetermined threshold, the restriction target flow identification unit 161 may restrict the communication bands for a predetermined number of flows in the descending order of the communication band.

Note that the above-mentioned predetermined threshold used by the restriction target flow identification unit 161 may be a value of the capacity of the communication line itself, or may be a value less than the capacity of the communication line. For example, by using a value less than the capacity of the communication line as the above-mentioned predetermined threshold value, the fair control unit 16 can restrict the communication band for each flow before 100% of the line capacity is used (before the communication line is in a busy state).

Note that when determining that the total amount of communication of flows in the above-mentioned monitoring period is a less than or equal to a predetermined threshold (for example, the capacity of the communication line), the restriction target flow identification unit 161 does not restrict the communication band. In the case where the communication band of any flow has already been restricted, when determining that the total amount of communication of flows is the predetermined threshold or less, the restriction target flow identification unit 161 instructs the band control unit 162 to cancel the restriction of the communication band of each flow.

The band control unit 162 restricts the communication bands for the flows identified by the restriction target flow identification unit 161. Specifically, the band control unit 162 restricts the communication bands such that, the total amount of communication for the flows identified by the restriction target flow identification unit 161 is less than or equal to a predetermined threshold (for example, the capacity of the communication line).

For example, the band control unit 162 restricts the communication band of each flow (the actual value of the inflow band) in the most recent monitoring period to the communication band reduced according to how large the communication band of the flow is.

An example is given. Here, consider the case where the flows that are targets of communication band restriction are the flow of the user A and the flow of the user B in FIG. 1. In this case, because the inflow band for the flow of the user A is 20 M (bps) and the inflow band for the flow of the user B is 12 M (bps) in the first monitoring period, the band control unit 162 restricts the communication band for the flow of the user A to 11.25 M (bps) and the communication band for the flow of the user B to 6.75 M (bps) in the next monitoring period according to these inflow bands.

In this way, the band control unit 162 restricts the communication bands of the top N flows in the descending order of the amount of communication (communication band) at a ratio of the amounts of communication of the flows. Thus, the fair control unit 16 can ensure fairness between the flows that are targets of communication band restriction.

Note that the restriction on the communication band of each flow by the band control unit 162 may be performed by, for example, the control of each policer 15 or the control of the shaper 17.

The shaper 17 shapes packets of the input flow. For example, the shaper 17 shapes packets of the flow input from the policer 15. The shaped packets of the flow are output to the outgoing line.

Processing Procedure

Figure 4:
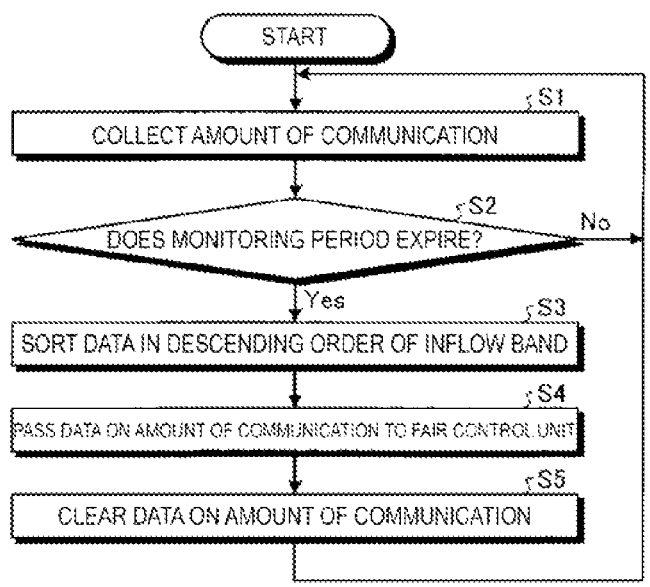
FIG. 4 is a flowchart illustrating an example of a processing procedure of a statistical information management unit in FIG. 2.
Figure 5:
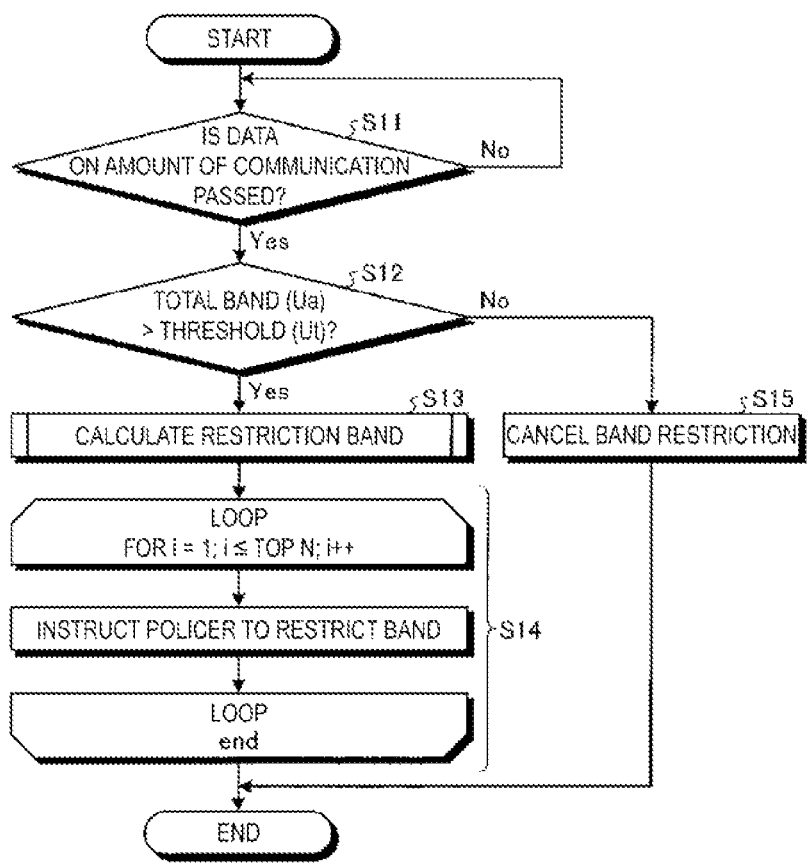
FIG. 5 is a flowchart illustrating an example of a processing procedure of a fair control unit in FIG. 2.
Figure 6:
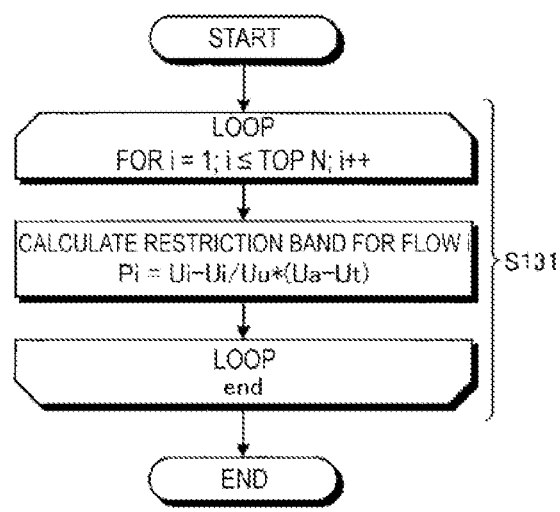
FIG. 6 is a flowchart illustrating an example of a processing procedure of S13 in FIG. 5.

Next, examples of processing procedures of the statistical information management unit 13 and the fair control unit 16 of the communication control apparatus 10 will be described using FIGS. 4 to 6.

First, an example of a processing procedure of the statistical information management unit 13 will be described using FIG. 4. The statistical information management unit 13 collects the amount of communication of each flow by the counter 12 (S1). Then, the data on the collected amount of communication of each flow is recorded in, for example, the statistical information 131. Thereafter, when receiving a notification indicating the expiration of the monitoring period from the monitoring timer 14 (Yes in S2), the statistical information management unit 13 sorts the data on the amount of communication of the flows in the statistical information 131 in the descending order of the inflow band (S3), and passes the sorted data on the amount of communication to the fair control unit 16 (S4). Then, to record data on the amount of communication in the next monitoring period, the statistical information management unit 13 clears the data on the amount of communication recorded in the statistical information 131 (S5), and the processing returns to S1. In S2, the statistical information management unit 13 continues the processing in S1 before receiving the notification indicating the expiration of the monitoring period from the monitoring timer 14 (No in S2).

Note that the statistical information 131 may have two areas for recording (storing) the data on the amount of communication such that the statistical information management unit 13 may quickly collect the amount of communication of each flow in the next monitoring period. In other words, in the statistical information 131, an area used to pass the data on the amount of communication from the statistical information management unit 13 to the fair control unit 16 and an area used for the statistical information management unit 13 to store the data on the amount of communication in the next monitoring period can be alternately replaced with each other. This can reduce a processing delay associated with the passing of the data on the amount of communication from the statistical information management unit 13 to the fair control unit 16, and the clearance of the data stored in the statistical information 131 by the statistical information management unit 13.

Next, an example of a processing procedure of the fair control unit 16 will be described using FIGS. 5 and 6. When the data on the amount of communication of each flow is passed from the statistical information management unit 13 (Yes in S11), the restriction target flow identification unit 161 of the fair control unit 16 determines whether the total amount of communication of the flows exceeds the predetermined threshold. For example, the restriction target flow identification unit 161 determines whether the total band (Ua) of the flows exceeds the predetermined threshold (Ut) (S12). Here, when the restriction target flow identification unit 161 determines that the total band (Ua) of the flows exceeds the predetermined threshold value (Ut) (Yes in S12), the restriction band of each flow is calculated (S13). That is, the restriction target flow identification unit 161 identifies a predetermined number of top flows (for example, top N flows) in the descending order of the inflow band as flows that are targets of communication band restriction, and the band control unit 162 calculates the restriction band for each of the flows. Details of the processing in S13 will be described below.

After S13, the band control unit 162 instructs the policer 15 to perform band restriction on each flow that is a target of communication band restriction such that the flow has the communication band calculated in S13 (S14). Then, the processing is terminated.

In contrast, when the restriction target flow identification unit 161 determines that the total band (Ua) of the flows is less than or equal to the predetermined threshold value (Ut) in S12 (No in S12), the band control unit 162 cancels the band restriction (S15). For example, the band control unit 162 instructs the policer 15 restricting the communication band for each flow to cancel the restriction of the communication band. Then, the processing is terminated.

Calculation Processing of Restriction Band

Next, with reference to FIG. 6, the processing of calculating the restriction band in S13 in FIG. 5 will be described in detail.

When the restriction target flow identification unit 161 determines that the total band (Ua) of the flows exceeds the predetermined threshold value (Ut) in S12 in FIG. 5 (Yes in S12), the band control unit 162 calculates, for example, the restriction bands (Pi) of the top i flows (i=1 to N) by Equation (1) described below (S131 in FIG. 6).

$$Pi=Ui-Ui/Uu*(Ua-Ut) \qquad \text{Equation (1)}$$

Here, Ui is the inflow band of the flow i (actual value), Ua is the total inflow band of all flows, and Uu is the total inflow band of the top N flows in the descending order of the amount of communication.

In other words, the band control unit 162 calculates the restriction band Pi for the flow i by subtracting Ui/Uu of the excessive band (in this case, Ua−Ut) from the inflow band (actual value) in proportion to the inflow band Ui for the flow i.

The band control unit 162 executes the processing in S131 for each of the flows i (i=1 to N).

In this way, the band control unit 162 calculates the restriction band for each flow that is a target of communication band restriction.

In this manner, the communication control apparatus 10 reduces, for example, the communication bands for the flows having a large amount of communication by a portion exceeding the predetermined threshold (Ut) in the total inflow band for all flows (Ua) in the communication line. As a result, the communication control apparatus 10 does not excessively restrict the communication band of each flow, improving the line usage efficiency and eliminating the effect on a flow having a small amount of communication.

Another Embodiment

Figure 7:
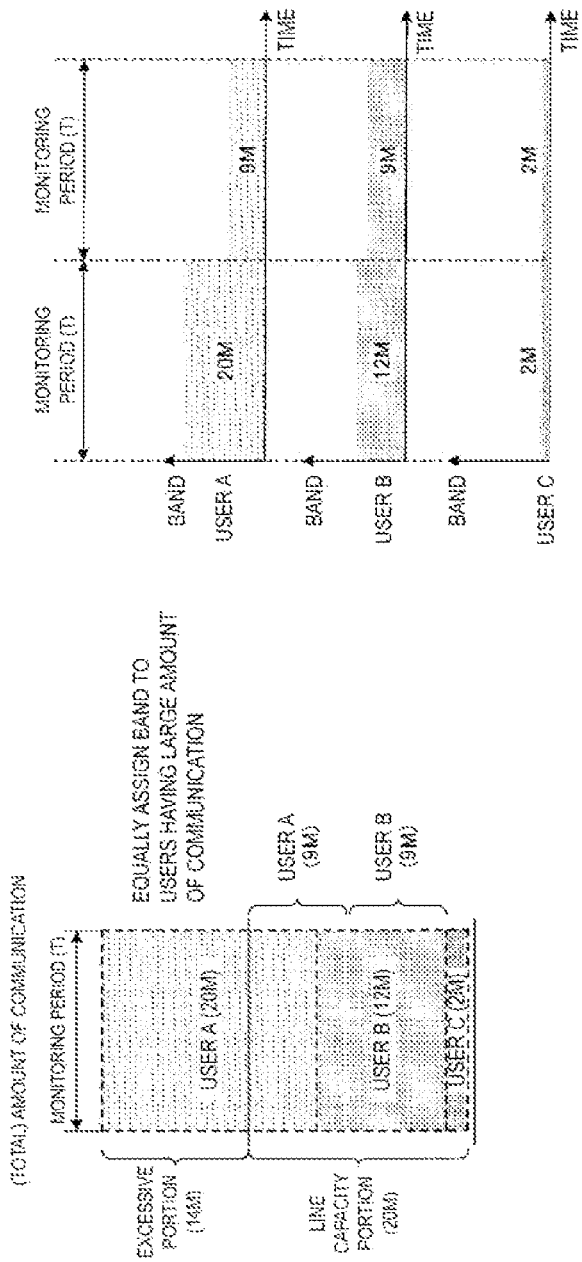
FIG. 7 is a view illustrating an overview of a communication control apparatus according to a further embodiment.

For example, in restricting the communication bands for the top N flows in the descending order of the amount of communication, the fair control unit 16 of the communication control apparatus 10 may equally assign the band to the top N flows. An example of calculating the restriction band for each flow in this case is described using FIG. 7.

For example, the fair control unit 16 equally assigns the band not assigned to the user C in the line capacity (20 M (bps)−2 M (bps)) to users having a large amount of communication (for example, the top two users A and B). That is, the communication control apparatus restricts the communication band for each of the flows of the users A and B to 9 M (bps) (=(20 M (bps)−2 (bps))/2). In contrast, the communication control apparatus does not restrict the communication band for the flow of the user C (2 M (bps)) lower than the top two users in the descending order of the amount of communication.

Figure 8:
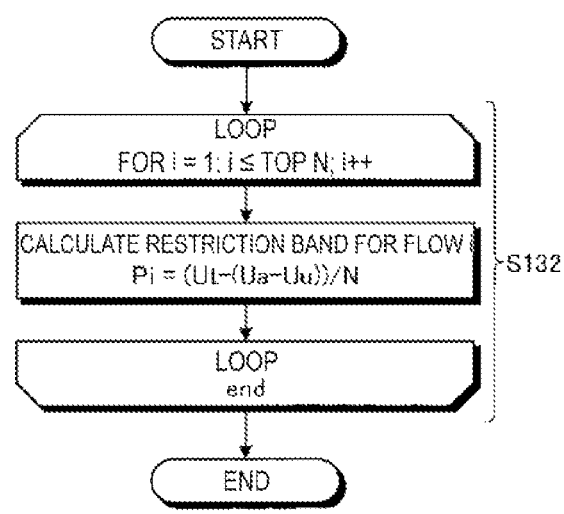
FIG. 8 is a flowchart illustrating an example of a processing procedure of S13 in FIG. 5 in the communication control apparatus according to the further embodiment.

The calculation processing of the restriction band by the band control unit 162 in this case will be described using FIG. 8. When the restriction target flow identification unit 161 determines that the total band (Ua) of the flows exceeds the predetermined threshold value (Ut) in S12 in FIG. 5 (Yes in S12), the band control unit 162 calculates, for example, the restriction bands (Pi) of the top i flows (i=1 to N) by Equation (2) described below (S132 in FIG. 8).

$$Pi=(Ut-(Ua-Uu))/N \qquad \text{Equation (2)}$$

In other words, the band control unit 162 calculates the band used for flows other than the top N flows (Ua−Uu) and subtracts (Ua−Uu) from the threshold (Ut) to calculate the available empty band for the top N flows. Thereafter, the band control unit 162 calculates the restriction band for each of the N flows by equally dividing the empty band by the N flows.

Program

The functions of the communication control apparatus 10 described in the embodiments described above can be implemented by installing a program that achieves such functions into a desired information processor (computer). For example, the information processor can execute the above-mentioned program provided as package software or online software, thereby functioning as the communication control apparatus 10. The information processing apparatus described here includes a desktop or laptop personal computer, a rack-mounted server computer, and the like. Furthermore, examples of the information processor include a mobile communication terminal such as a smart phone, a mobile phone, and a Personal Handyphone System (PHS), as well as Personal Digital Assistant (PDA). The communication control apparatus 10 can also be implemented on a cloud server.

Figure 9:
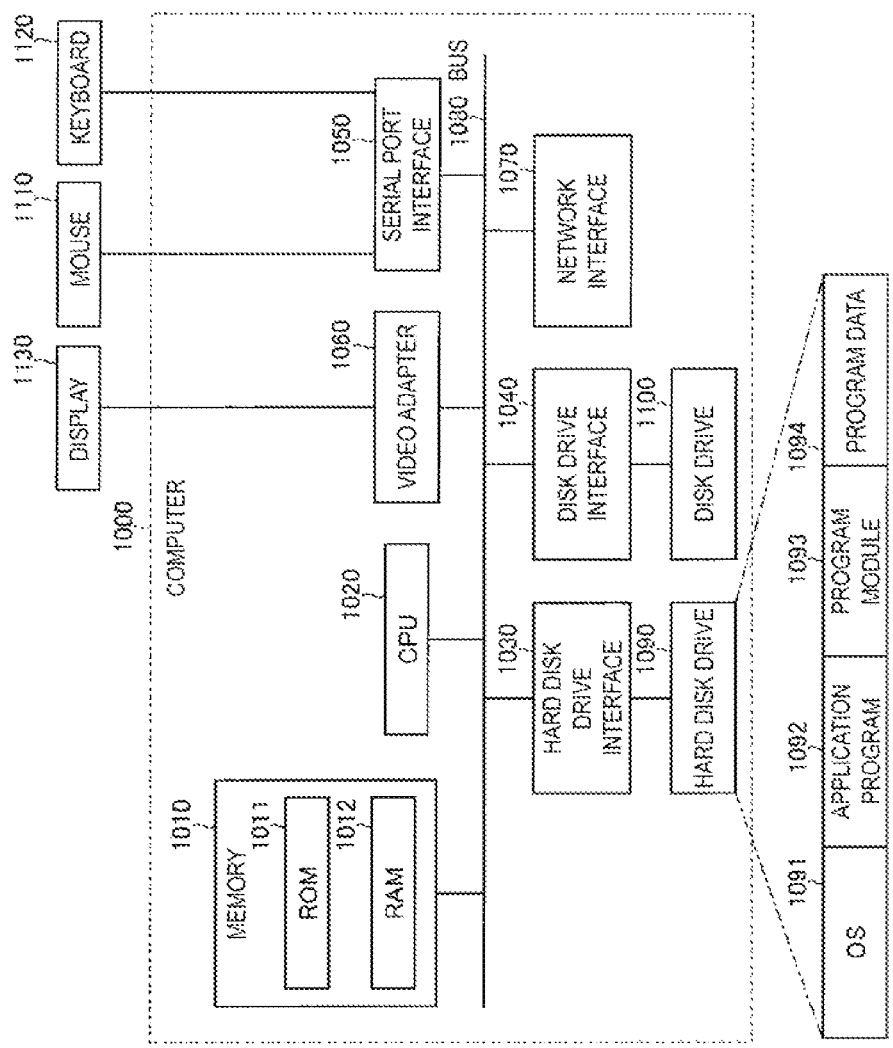
FIG. 9 is a view illustrating an example of a computer that executes a communication control program.

An example of a computer that executes the program (control program) described above will be described with reference to FIG. 9. As illustrated in FIG. 9, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a Read Only Memory (ROM) 1011 and a Random Access Memory (RAM) 1012. The ROM 1011 stores a boot program, such as a Basic Input Output System (BIOS), for example. The hard disk drive interface 1030 is connected to a hard disk drive 1090. The disk drive interface 1040 is connected to a disk drive 1100. A removable storage medium, such as a magnetic disk or an optical disk for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 9. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as appropriate, and executes each of the aforementioned procedures.

The program module 1093 and the program data 1094 related to the control program described above is not limited to the case where they are stored in the hard disk drive 1090. For example, the program module 1093 and the program data 1094 may be stored in a removable storage medium and read out by the CPU 1020 via the disk drive 1100 or the like. Alternatively, the program module 1093 and the program data 1094 related to the above-mentioned program may be stored in another computer connected via a network such as a Local Area Network (LAN) or a Wide Area Network (WAN) and read by the CPU 1020 via the network interface 1070.

REFERENCE SIGNS LIST

10 Communication control apparatus
11 Distribution unit
12 Counter
13 Statistical information management unit
14 Monitoring timer
15 Policer
16 Fair control unit
131 Statistical information
161 Restriction target flow identification unit
162 Band control unit

The invention claimed is:

1. A communication control apparatus configured to control bands for flows, the communication control apparatus comprising a processor configured to execute operations comprising:
monitoring an amount of communication of each of the flows input to a communication line in a predetermined period;
when a sum of the monitored amount of communication of each of the flows exceeds a predetermined threshold that is smaller than or equal to a capacity of the communication line, identifying target flows for communication band restriction according to a predetermined number of top flows in a descending order of the amount of communication input to the communication line; and
restricting a communication band of each of the target flows of the communication band restriction such that the sum of the monitored amount of communication of each of the flows input to the communication line is smaller than or equal to the predetermined threshold,
wherein the predetermined number is a number acquired by multiplying the number of the flows input to the communication line by a predetermined ratio.

2. The communication control apparatus according to claim 1, wherein
the identifying further comprises identifying the target flows according to a predetermined number of flows in the descending order of the amount of communication from flows having an amount of communication exceeding the predetermined threshold among the flows input to the communication line.

3. The communication control apparatus according to claim 1, wherein
the restricting further comprises restricting the communication band of each of the target flows according to the amount of communication of each of the target flows.

4. The communication control apparatus according to claim 1, wherein the restricting further comprises restricting the communication band of an outgoing line of the communication line based on the monitored amount of communication of an inflow line of the communication line.

5. The communication control apparatus according to claim 1, wherein the restricting further comprises restricting the communication band using one or both of a shaper and a policer, wherein the shaper shaping the communication band and the policer policing the flows of data packets.

6. The communication control apparatus according to claim 1, wherein the communication line is a best-effort communication line.

7. A communication control method performed by a communication control apparatus configured to control bands for flows, the communication control method comprising:
monitoring an amount of communication of each of the flows input to a communication line in a predetermined period;
when a sum of the monitored amount of communication of each of the flows exceeds a predetermined threshold that is smaller than or equal to a capacity of the communication line, identifying target flows for communication band restriction according to a predetermined number of top flows in a descending order of the amount of communication input to the communication line; and
restricting a communication band of each of the target flows of the communication band restriction such that the sum of the monitored amount of communication of each of the flows input to the communication line is smaller than or equal to the predetermined threshold,
wherein the predetermined number is a number acquired by multiplying the number of the flows input to the communication line by a predetermined ratio.

8. The communication control method according to claim 7, wherein
the identifying further comprises identifying the target flows according to a predetermined number of flows in the descending order of the amount of communication from flows having an amount of communication exceeding the predetermined threshold among the flows input to the communication line.

9. The communication control method according to claim 7, wherein
the restricting further comprises restricting the communication band of each of the target flows according to the amount of communication of each of the target flows.

10. The communication control method according to claim 7, wherein the restricting further comprises restricting the communication band of an outgoing line of the communication line based on the monitored amount of communication of an inflow line of the communication line.

11. The communication control method according to claim 7, wherein the restricting further comprises restricting the communication band using one or both of a shaper and a policer, wherein the shaper shaping the communication band and the policer policing the flows of data packets.

12. The communication control method according to claim 7, wherein the communication line is a best-effort communication line.

13. A system for controlling communication performed by a communication control apparatus configured to control bands for flows, the system comprises:
a processor; and
a memory storing computer-executable instructions that when executed by the processor cause the system to execute operations comprising:
monitoring an amount of communication of each of the flows input to a communication line in a predetermined period;
when a sum of the monitored amount of communication of each of the flows exceeds a predetermined threshold that is smaller than or equal to a capacity of the communication line, identifying target flows for communication band restriction according to a predetermined number of top flows in a descending order of the amount of communication input to the communication line; and
restricting a communication band of each of the target flows of the communication band restriction such that the sum of the monitored amount of communication of each of the flows input to the communication line is smaller than or equal to the predetermined threshold,
wherein the predetermined number is a number acquired by multiplying the number of the flows input to the communication line by a predetermined ratio.

14. The system of claim 13, wherein
the identifying further comprises identifying the target flows according to a predetermined number of flows in the descending order of the amount of communication from flows having an amount of communication exceeding the predetermined threshold among the flows input to the communication line.

15. The system of claim 13, the restricting further comprises restricting the communication band of each of the target flows according to the amount of communication of each of the target flows.

16. The system of claim 13, wherein the restricting further comprises restricting the communication band of an outgoing line of the communication line based on the monitored amount of communication of an inflow line of the communication line.

17. The system of claim 13, wherein the restricting further comprises restricting the communication band using one or both of a shaper and a policer, wherein the shaper shaping the communication band and the policer policing the flows of data packets.

* * * * *